Aug. 27, 1957    H. C. HUNT    2,804,244
CUFF SHAPING MACHINE

Filed Nov. 10, 1955    6 Sheets-Sheet 1

INVENTOR.
HARRY C. HUNT
BY *Leon Edelson*
ATTORNEY

United States Patent Office 2,804,244
Patented Aug. 27, 1957

2,804,244

CUFF SHAPING MACHINE

Harry C. Hunt, Reading, Pa., assignor to American Safety Table Company, Inc., Reading, Pa., a corporation of Pennsylvania Application November 10, 1955, Serial No. 546,085

12 Claims. (Cl. 223—2)

This invention relates generally to apparatus for shaping and pressing articles of a type having multiple plies of fabric and more particularly to apparatus for shaping and pressing collars, cuffs, flaps and other such garment parts having edges that are required to be sharply defined.

As is well known in the art, multiple ply collars, cuffs, flaps and the like units, normally consisting of a pair of facing plies and an interliner, are conventionally manufactured by initially sewing the several plies thereof together along all but their inner edges, following which the unit is turned right side out and pressed to shape to condition it for securement to the garment of which it is to form a part. The apparatus of the present invention is designed to facilitate the shaping and pressing of the multiple ply unit to final form.

A principal object of the present invention is to provide an apparatus which increases the speed of pressing such units to shape, which insures the production of such articles having uniformly trim and sharply defined edges, and which shapes and presses the article to eliminate wrinkles throughout the full body thereof.

A further object of the present invention is to provide a sectional die blade assembly the effective length of which is conveniently decreased as the work is drawn thereover, whereby the operation of mounting the work is greatly facilitated, and the sections of which automatically adjust to the length of the work and act to draw the work taut in order to condition the same for being pressed to shape.

Still another object of the present invention is to provide apparatus utilizing a pair of die blade assemblies and means for excluding each of these assemblies from the loading zone while the other is unloaded and reloaded and until the reloaded assembly is about to leave the loading zone, whereupon the assembly excluded as aforesaid is automatically released for entry into the loading zone for unloading and reloading.

Other objects and advantages of the present invention will appear more fully hereinafter, it being understood that the present invention consists in the combination, construction, location and relative arrangement of parts, all as will be more fully described hereinafter, as is shown in the accompanying drawings and will be pointed out in the appended claims.

The general type of machine with which applicant is concerned is disclosed in Patent No. 2,619,269, issued to M. T. Voigt on November 25, 1952, and Patent No. 2,706,587, issued to S. R. Frankel on April 19, 1955, to which patents reference is made for such details of construction and operation as are not given hereinafter.

Figure 1:
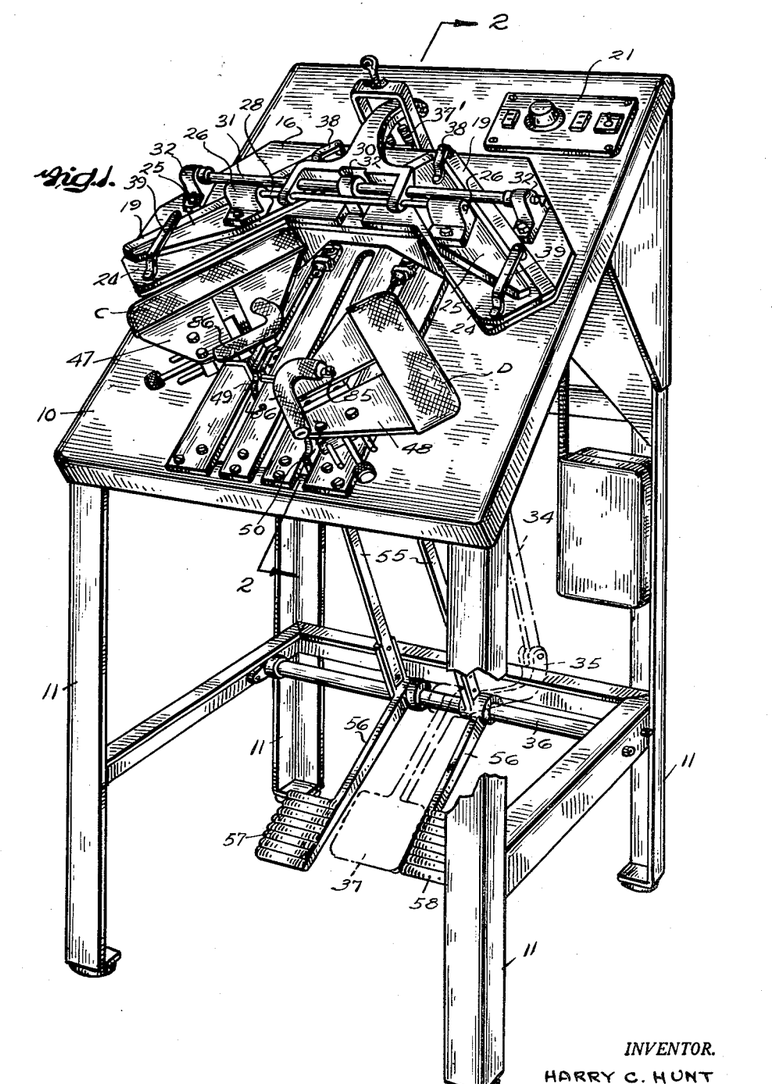
Figure 1 is a perspective view of apparatus constructed in accordance with and embodying the principles of the present invention, the die blade assemblies being shown loaded and one die blade assembly being shown in loading position while the other is shown in an intermediate, arrested position.
Figure 3:
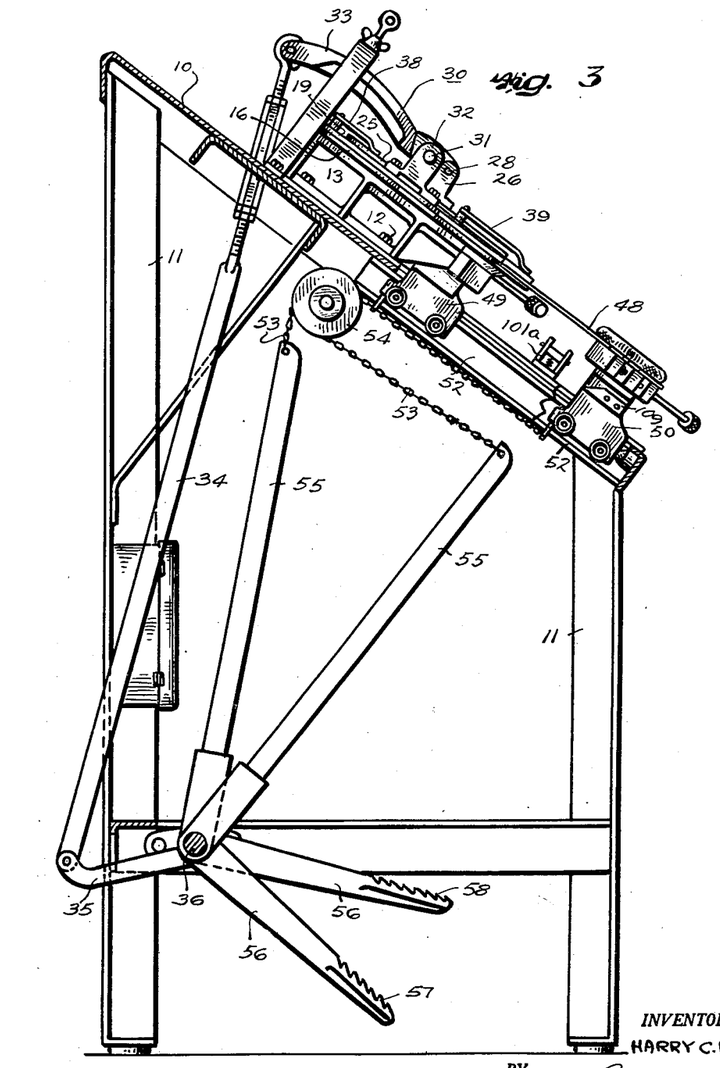
Figure 3 is similar ot Figure 2, however, it shows an arrangement wherein the pressure applying means is foot operated, the die blade assemblies being shown respectively in loading and pressing positions.
Figure 4:
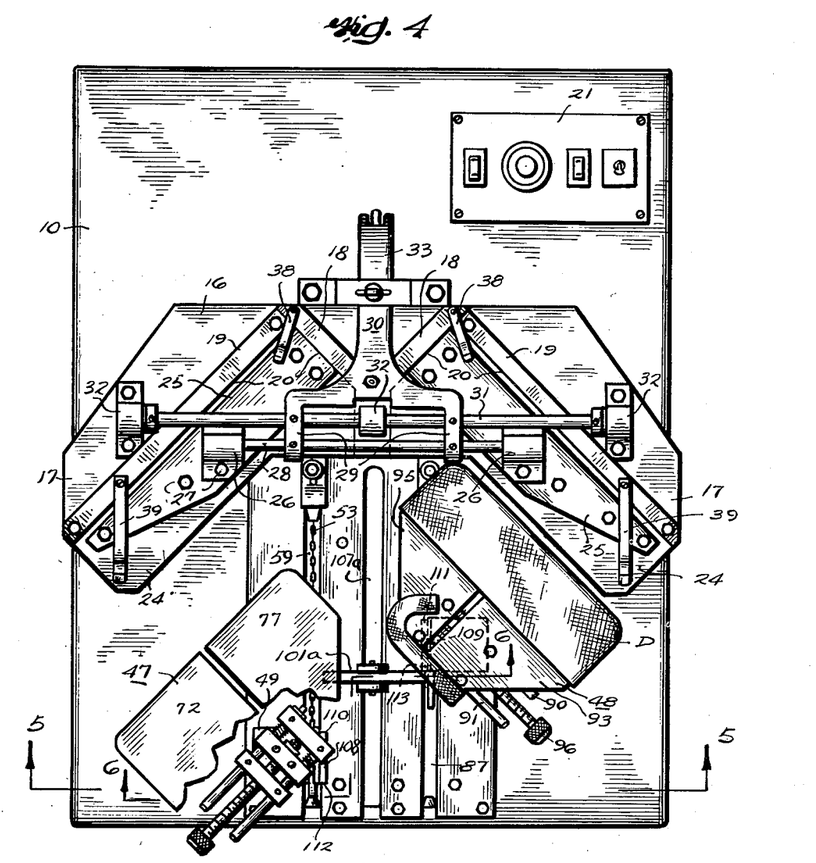
Figure 4 is a plan view of the apparatus of Figure 1, the die blade assemblies being reversed in position and one die blade assembly being shown loaded while the other is shown unloaded, parts being broken away to expose the carriage underlying one of the die blade assemblies.
Figure 5:
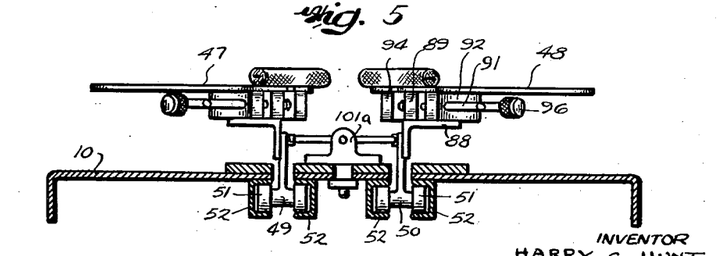
Figure 5 is a vertical section along the line 5—5 of Figure 4.
Figure 6:
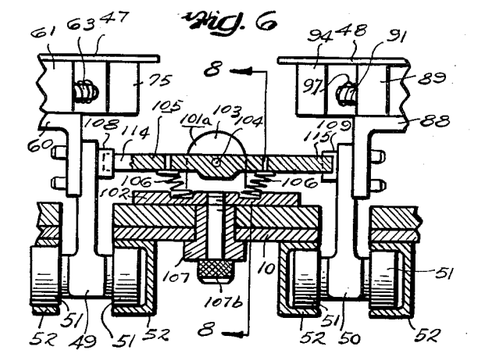
Figure 6 is an enlarged vertical section along line 6—6 of Figure 4, showing the mechanism for excluding the die blade assembly from the loading zone in horizontally extending, arresting position.
Figure 7:
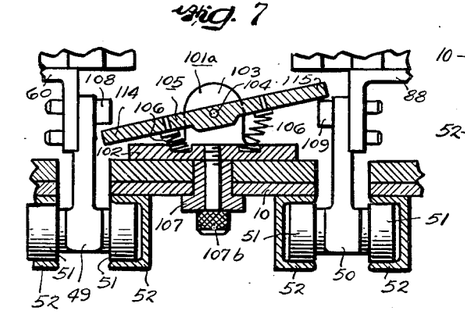
Figure 7 is similar to Figure 6, however, the mechanism aforesaid is shown in inclined, releasing position.
Figure 8:
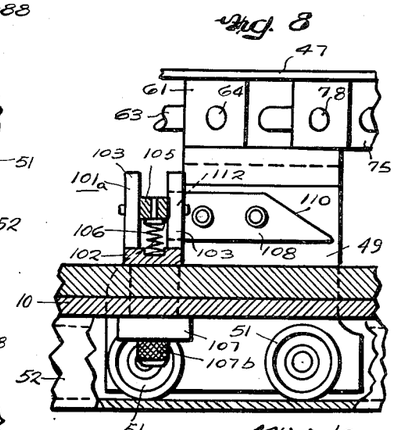
Figure 8 is a vertical section along line 8—8 of Figure 6, however, the die blade assembly is shown in arrested position, as in Figure 1.

Referring to the drawings, and particularly to Figures 1, 3 and 4, in the apparatus of the present invention the several operating mechanisms are suitably mounted on and supported by a floor-supported table having a forwardly and downwardly sloping top 10 suitably mounted upon a plurality of vertically extending legs 11.

Figure 9:
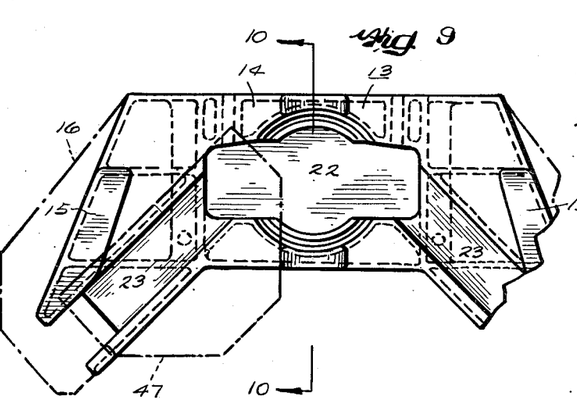
Figure 9 is a plan view of the housing for the electric heating units, shown alone.
Figure 10:
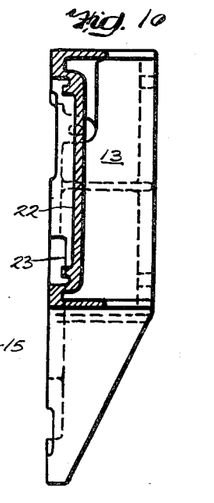
Figure 10 is a section along the line 10—10 of Figure 9.

Secured to the table top 10, as by bolts 12, is a member 13 that is best shown in Figures 3, 9 and 10, wherein a main body portion is designated 14 and a pair of diverging opposite end wing portions are designated 15—15. Overlying the member 13 and suitably secured to the latter is a base plate 16 that generally corresponds in shape to the member 13, being of generally trapezoidal form and having a relatively wide opening in its basal edge that forms a pair of relatively divergent portions 17—17. Suitably fixedly secured to the base plate 16 and disposed on the top thereof are a pair of plate members 18—18 and a pair of comparatively long plate members 19—19 relatively disposed to conjointly form a pair of recesses 20—20, each of generally triangular form and of uniform depth, each recess being bound upon only two of its sides to provide a relatively wide entrance opening at the forward end of the base plate 16.

The table top is provided with a set of suitably located electric heating units (not shown) that are designed to supply heat at a predetermined maximum temperature at conveniently located points on the table, each unit being individually supplied with operating current through independent thermostatically controlled means designated generally by the numeral 21. The heating units aforesaid are housed between the base plate 16 and the underlying member 13, the latter being provided with depressions, designated 22, 23—23 for receiving these heating units.

Superimposed upon the base plate 16 and forming therewith a presser head are a pair of presser members or shoes 24—24 corresponding ends of which respectively fit snugly in the recesses 20—20. The shoes 24—24 overlie substantially the full areas of the recesses 20—20 to exert a shaping pressure on any article which may be shifted into the presser head. Overlying the shoes 24—24 are a pair of reinforcing plates 25—25 and a pair of pivot blocks 26—26, each shoe 24 and its associated reinforcing plate 25 and pivot block 26 being suitably secured together, as by studs 27.

The pivot blocks 26—26 are oscillatably mounted upon the opposite end portions respectively of a pivot rod 28, being suitably secured against shifting axially. The latter is fixedly mounted upon laterally spaced arms 29—29 of a yoke shaped member 30 that is fixedly mounted upon a rocker shaft 31 axially spaced portions of which are journaled respectively in a set of bearings 32 suitably bolted to the base plate 16. It will be apparent that upon rotation of the yoke 30 about the axis of the rocker shaft 31 clockwise, as viewed in Figure 3, the pivot rod 28 will be depressed, in consequence of which, pressure will be applied to the shoes 24—24 through the intervention of the pivot blocks 26—26 and reinforcing plates 25—25.

The yoke 30 is provided with an arm 33 that extends rearwardly from the rocker shaft 31 and which is connected by a link 34 to a foot pedal lever 35 suitably journaled upon a transversely extending shaft 36 mounted adjacent the bottom of the machine, this lever being provided at its forward free end with a foot engaging pedal 37. It will be apparent that upon depressing the foot pedal 37, the link 34 will be shifted vertically upward to rotate the yoke 30 about the shaft 31 and so cause the rod 28 to be depressed, in consequence of which pressure will be applied to the shoes 24—24 as aforesaid.

The weight of the arm 33 and the link 34 connected to the lever 35 plus the pull of a tension spring 37' upon the arm 33 is normally sufficient to maintain the shoes 24—24 raised above the base plate 16, the extent of this spacing being determined largely by a set screw (not shown). For securing the shoes 24—24 against undesired oscillatory movement about the pivot rod 28 while the same are in raised, nonpressing position, a set of leaf springs 38—39 are anchored to the base plate 16 and act on the shoes 24—24 to stabilize the same.

Figure 2:
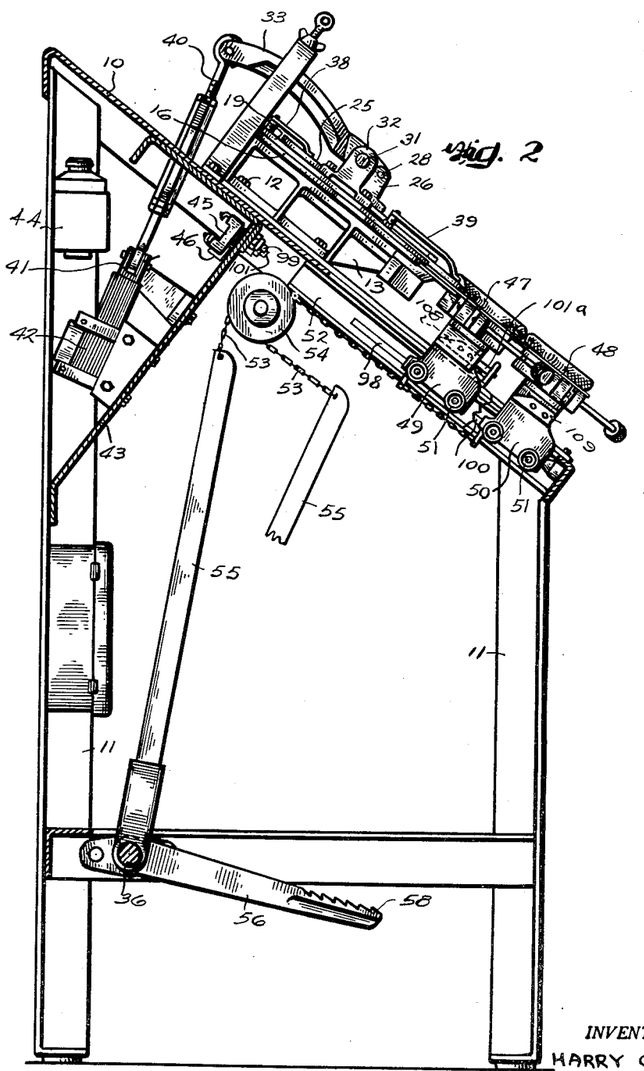
Figure 2 is a vertical section along the line 2—2 of Figure 1, showing an arrangement wherein the pressure applying means is solenoid operated.

Now referring particularly to Figures 1, 2 and 4, in the modified form of the apparatus of the present invention, for rocking the yoke 30 about the axis of the shaft 31 in order to move shoes 24—24 from non-pressing to pressing position there is provided suitable articulated linkage, of which only an adjustable member 40 is shown, that operatively connects the arm 33 with the armature 41 of an electro-magnetic solenoid unit designated generally by the numeral 42. The electro-magnetic solenoid unit 42 is suitably included in electric circuit with an automatic electric timer relay 44 and a pair of microswitches 45—46, all suitably mounted on the floor supported table. The automatic electric timer relay 44 is of a type which operates, when its electric control circuit is closed by either of the switches 45—46, to energize the solenoid unit 42 and to delay de-energization thereof for a predetermined period of time. The time delay for de-energization of the solenoid is fixed by proper setting of the timer relay, which automatically deenergizes the solenoid at the end of the fixed period. The switches 45—46 are preferably located beneath the table top 10 with their actuating buttons presented forwardly and downwardly for actuation by means to be described hereinafter.

The apparatus is provided with a pair of laterally spaced die blade assemblies designated generally by the numerals 47—48 that are arranged in coplanar relation for rectilinear shifting movement in their plane for positioning in the presser head articles desired to be pressed. These die blade assemblies are carried respectively by carriages designated generally by the numerals 49—50, each of which die blade carriages is suitably provided with a set of roller wheels 51 that travel on tracks 52 under the table top 10. Coil tension springs (not shown) connect the carriages 49—50 with fixed anchorages on the apparatus, these springs being operative to bias the carriages and the die blade assemblies mounted thereon toward a retracted or loading position at the front of the apparatus.

For advancing the die blade assemblies 47—48 from the loading position to the pressing position against the influence of the springs aforesaid, each carriage is connected, by a cable 53 passing around a suitable sheave 54, to the upper end of one arm 55 of a bell crank lever suitably journalled upon the shaft 36, the opposite arm 56 of the lever associated with the die blade assembly 47 and die blade carriage 49 being provided at its free end with a foot pedal 57, and the opposite arm 56 of the lever associated with the die blade assembly 48 and the die blade carriage 50 being provided at its free end with a foot pedal 58. It will be apparent that upon depressing the pedals 57—58, the wheeled carriages 49—50 will be advanced along their tracks and the die blade assemblies 47—48 will approach the presser head, it being understood, of course, that the pedals 57—58 are operated independently of one another, in consequence of which the die blade assemblies 47—48 shift fore and aft of the machine independently of one another.

For mounting the die blade assembly 47 upon the underlying carriage 49, a longitudinally extending main body part of the latter is projected upwardly through a longitudinal slot 59 formed in the table top 10. Suitably attached to this main body part is an angle bracket one leg 60 of which extends laterally from one side of the main body part aforesaid in a plane parallel to the table top 10. Seated upon the bracket leg 60 is a stationary block 61 that carries a pair of guide rods 62—63 which are slidably fitted into the block 61. For securing the rods 62—63 against shifting axially, the block 61 is suitably provided with a pair of set screws 64—64. The rods 62—63 are disposed in a plane parallel to the table top 10 and parallel to one another. Major portions of these rods, respectively designated 65—66, are disposed on one side of the block 61, while minor portions thereof, respectively designated 67—68, are disposed on the opposite side of the block 61, the portions 66 and 68 of the rod 63 being secured together as at 69 for pivoted movement relative to one another about an axis normal to the table top 10.

Slidably fitted upon the major rod portions 65—66 is a block 70 to which is attached, as by studs 71, a die blade section 72. Between the rod portions 65—66 is an adjusting screw 73 that has a reduced end portion 74 suitably fitted revolubly into the block 61. The main body of the screw 73 is threaded into the block 70. It will be apparent that upon turning the screw 73 the block 70 and the overlying die blade section 72 carried thereby will be shifted on the guide rods 62—63 relative to the block 61.

Figures 11, 12, 13, 14:
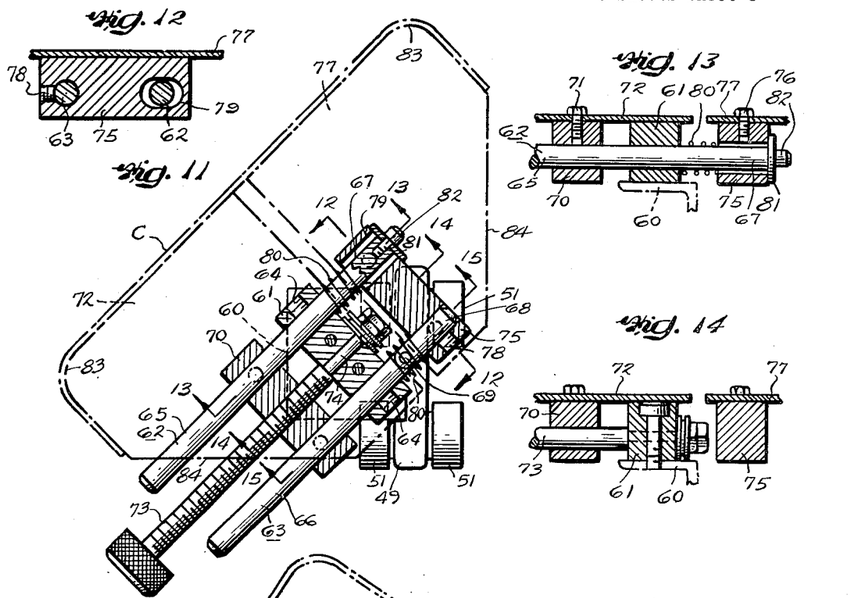
Figure 11 is a section looking down on a carriage for mounting a die blade assembly, the work and die blade assembly being shown in broken lines and the work being shown fully mounted on the die blade assembly.
Figures 12, 13, 14 and 15 are sections along lines 12—12, 13—13, 14—14 and 15—15, respectively, of Figure 11.

Carried by the minor rod portions 67—68 is a block 75 to which is attached, as by studs 76, a die blade section 77. For securing the block 75 against shifting axially on the rod portion 68, the former is provided with a set screw 78, and to allow for swinging movement of the rod portion 68 and the block 75 as a unit about the pivot 69, the rod portion 67 is projected through an elongated opening 79 formed in the block 75, as best shown in Figure 12. Embracing the minor rod portions 67—68 and disposed between the blocks 61 and 75 are a pair of compression springs 80—80 that are arranged to bias the block 75 against a stop 81 which is suitably secured to the end of the rod portion 67 by a stud 82. It will be apparent that when a pull is exerted upon the die blade section 77 in the direction of the die blade section 72, the block 75 and the overlying die blade section 77 will swing about the pivot 69 against the influence of the springs 80—80, and when the die blade section 77 is released, the latter will swing back toward its initial position under the influence of the springs 80—80.

The die blade sections 72 and 77 conjointly provide a die blade assembly 47 that is generally rectangular in shape and disposed at a suitable angle relative to the table top 10, as shown, the corners on the work mounting side thereof being rounded as at 83—83, and the corners on the opposite side being cut off as at 84—84. It will be apparent that, after loosening the set screws 64—64, the guide rods 62—63 may be shifted axially relative to the block 61, in consequence of which the die blade section 77, carried by the guide rods aforesaid, will be shifted correspondingly relative to the block 61. Attached to the die blade, as at 85, for movement therewith is a bumper 86 which is arranged in overlying relation to the edges of the die blade sections 72—77 on the side of the die blade assembly remote from the work mounting side.

For mounting the die blade assembly 48 upon the underlying carriage 50, a longitudinally extending main body part of the latter is projected upwardly through a longitudinal slot 87 formed in the table top 10. Attached to this main body part is a bracket 88, and seated upon the latter is a block 89 that carries a pair of guide rods 90—91. Upon these guide rods are mounted a block 92 that mounts a die blade section 93 and a block 94 that mounts a die blade section 95. An adjusting screw is indicated by the numeral 96, and a compression spring is indicated by the numeral 97. The construction and mounting of the die blade assembly 48 is the same, albeit to the opposite hand, as that of the die blade assembly 47, in consequence of which a detailed description of the die blade assembly 48 is believed to be unnecessary for a full understanding of the present invention.

Figures 15, 16, 17:
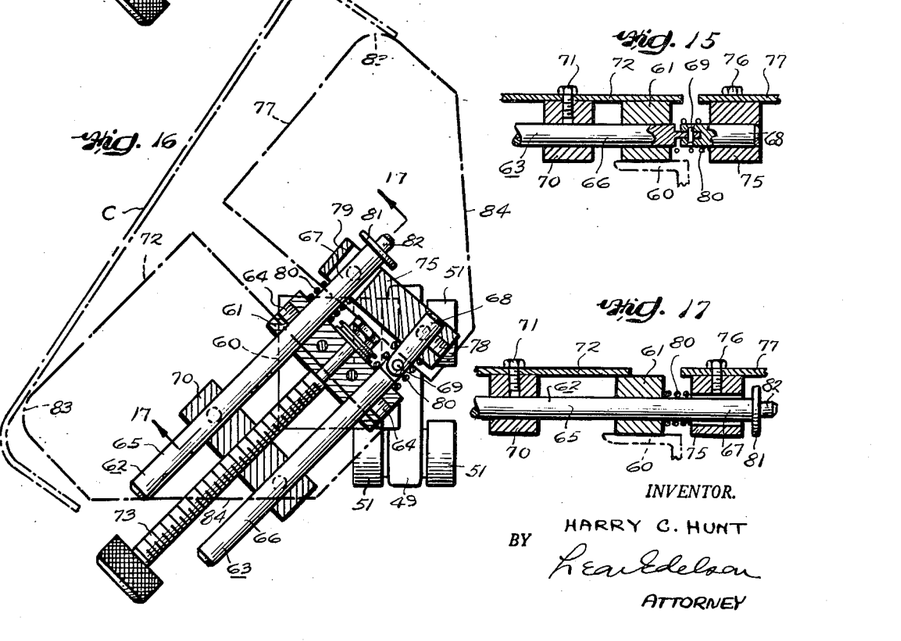
Figure 16 is similar to Figure 11, however, the work is shown only partially mounted or drawn over the die blade assembly.
Figure 17 is a section along line 17—17 of Figure 16.

Referring particularly to Figures 11 and 16, for mounting an article to be pressed upon the die blade assembly 47, the preferred practice is to shift the die blade section 72, by manipulation of the screw 73, so that the overall effective length of the die blade assembly is slightly greater than the inside length of the articles to be pressed. Then one end of the article, a cuff C, for example, is partially drawn over the die blade section 77 and pulled so as to swing the die blade section 77 toward the die blade section 72, whereupon the effective length of the assembly is reduced materially. The opposite end of the cuff C now may be conveniently slipped over the die blade section 72, as best shown in Figure 16. Then the cuff C is drawn into full engagement with the die blade sections 72 and 77 and released, whereupon the die blade section 77 swings back, away from the die blade section 72, in consequence of which the cuff C is drawn taut, being thereby effectively conditioned to be pressed, as shown in Figure 11.

This operation of fitting the cuff turned right-side-out upon the die blade assembly is performed while the die blade assembly is in its loading position at the front of the apparatus, and thereafter the foot pedal 57 is depressed to shift the die blade assembly with its fitted cuff C thereon into its pressing recess 20. Referring particularly to the form of the apparatus shown in Figures 1, 3 and 4, the foot pedal 37 is then depressed to press the cuff C between the base plate 16 and the shoe 24 overlying the cuff C. Pressure is maintained upon the cuff C until the latter is completely shaped and pressed under the heat and pressure applied by the coacting base plate and its overlying shoe. It will be understood, of course, that during all of the operation above described, the base plate 16 and the shoe 24 will have been heated by the underlying electric heating units to a sufficient temperature. Having completed the pressing of the cuff C as just described, the foot pedals 57 and 37 are released, whereupon the pressure on the cuff C is relieved and the die blade assembly with the pressed cuff C thereon withdraws from the pressing recess 20 under the influence of the springs mentioned hereinbefore (not shown).

While the cuff C remains subject to heat and pressure under the left hand shoe 24, cuff D is drawn over the die blade sections 93 and 95 of the die blade assembly 48, in the same manner as was employed to draw the cuff C over the die blade sections 72 and 77 of the die blade assembly 47. After the cuff C has withdrawn from the presser head, the foot pedal 58 is depressed, whereupon the die blade assembly 48 with its fitted cuff D thereon is shifted into the other pressing recess 20. Then the foot pedal 37 is depressed, whereupon the left hand shoe 24 overlying the cuff D descends upon the cuff D and presses the latter against the base plate 16. When the pressing operation is completed, the foot pedals 58 and 37 are released, whereupon the pressure on the cuff D is relieved and the die blade assembly 48 with the cuff D thereon withdraws from the pressing head.

While the cuff D remains subject to heat and pressure under the right hand shoe 24, the previously pressed cuff C is removed from the die blade assembly 47, whereupon the operation hereinabove described is repeated. It will be apparent that while a cuff is being pressed on either side of the apparatus, another cuff already pressed on the other side of the apparatus is being replaced by an unpressed cuff.

With regard to the form of the apparatus illustrated in Figures 1, 2 and 4, when the die blade assembly 47 is shifted with its fitted cuff C thereon into the left hand pressing recess 20, in response to actuation of the foot pedal 57, one end portion of a rod 98 carried by the die blade carriage 49 engages an actuating button 99 of the microswitch 45 as the carriage 49 approaches the limit of its travel, whereupon the electric control circuit of the timer relay 44 is closed and the solenoid unit 42 is energized in consequence of which the armature 41 of the solenoid, acting through its linkage with the arm 33 of the yoke 30, closes the presser head upon the cuff C. The presser head is maintained closed by the timer relay 44 for a predetermined period of time, at the expiration of which the control circuit of the timer relay 44 is opened and the solenoid unit 42 is de-energized, whereupon the presser head opens and the die blade assembly 47 with the cuff C thereon withdraws from the presser head. It will be apparent that the operator may release the foot pedal 57 as soon as the presser head has closed upon the die blade assembly 47 and the cuff C.

When the die blade assembly 48 is shifted with its fitted cuff D thereon into the pressing right hand recess 20, in response to actuation of the foot pedal 58, one end portion of a rod 100 carried by the die blade carriage 50 engages an actuating button 101 of the microswitch 46 as the carriage 50 approaches the limit of its travel, whereupon the electric control circuit of the timer relay 44 is again closed and the solenoid unit 42 is again energized, in consequence of which the armature 41 of the solenoid, acting through its linkage with the arm 33 of the yoke 30, closes the presser head upon the cuff D. The pressser head is maintained closed by the timer relay 44 for the predetermined period of time, at the expiration of which the control circuit of the timer relay 44 is again opened and the solenoid unit 42 is again de-energized, whereupon the presser head opens and the die blade assembly 48 with the cuff D thereon withdraws from the presser head. It will be apparent that the operator may release the foot pedal 58 as soon as the presser head has closed upon the die blade assembly 48 and the cuff D.

For excluding each of the die blade assemblies from the loading zone, at the front of the apparatus, while the other die blade assembly is being unloaded and reloaded, the table top 10 is fitted with a stop mechanism designated generally by the numeral 101a. The base member of this mechanism has a flat rectangular bottom 102 opposite side portions of which respectively mount a pair of opposed upright ears 103—103 that suitably receive the opposite end portions of a pin 104. This pin 104 projects through an intermediate portion of a stop bar 105, which bar 105 normally is maintained parallel to the table top 10 by a pair of coil springs 106—106 that are operatively interposed between the base member and the stop bar 105, on opposite sides of the pivot pin 104. For securing the mechanism to the table top 10, the main body of a suitable externally flanged sleeve 107 is projected upwardly through a longitudinal slot 107a formed in the table top 10, and a bolt 107b is projected through the sleeve 107 and threaded into the bottom 102 of the base member.

The proximate sides of the upstanding main body parts of the carriages 49—50 are provided respectively with cam members designated 108—109. These cam members are rectangular in transverse cross section, and the ends thereof facing the presser head are formed with sloping cam surfaces respectively designated 110—111, while the ends thereof facing in the opposite direction are square, as at 112—113, respectively. The opposite end portions of the stop bar 105, respectively designated 114—115, are normally disposed respectively in the paths of these cam members 108—109.

In the operation of the apparatus, when either of the die blade assemblies withdraws from the presser head, normally the other die blade assembly is in the loading zone and the stop bar 105 is parallel to the table top 10. As the withdrawing die blade carriage approaches the stop mechanism 101a the blunt end of the cam member carried thereby engages the associated end portion of the stop bar 105, whereupon the die blade carriage is arrested and the assembly carried thereby is excluded from the loading zone. Upon actuation of the foot pedal that controls the fore and aft shifting movement of the reloaded other die blade assembly, the carriage underlying the latter aproaches the stop mechanism 101a and the beveled end of the cam member carried thereby engages the other end of the stop bar 105, lifting the same and rocking the stop bar 105 about the axis of the pin 104 so that the end thereof arresting the withdrawing carriage is lowered sufficiently to release the latter, whereupon the same moves into the loading zone. Simultaneously, of course, the reloaded die blade assembly moves into the presser head. For the sake of clarity, a more detailed description of the operation of the stop mechanism follows.

When the die blade assembly 47, for example, withdraws from the presser head, normally the die blade assembly 48 is in the loading zone and the stop bar 105 is parallel to the table top 10. As the die blade carriage 49 underlying the die blade assembly 47 approaches the stop mechanism 101a the blunt end 112 of the cam member 108 carried thereby engages the end portion 114 of the stop bar 105, whereupon the die blade carriage 49 is arrested and the assembly 47 carried thereby is excluded from the loading zone. Upon actuation of the foot pedal 58, the die blade carriage 50 approaches the stop mechanism 101a, and the beveled end 111 of the cam member 109 carried thereby engages the end portion 115 of the stop bar 105, lifting the same and rocking the stop bar 105 about the axis of the pin 104 against the influence of the springs 106—106 so that the end portion 114 arresting the carriage 49 is lowered sufficiently to release the latter, whereupon the same moves into the loading zone. Simultaneously, of course, the die blade assembly 48 moves into the presser head and the stop bar 105 under the influence of the springs 106—106, is returned to its normal position. It will be apparent that the stop mechanism 101a is adjustably fixed in position, and that the arrangement described is designed to protect the operator from being struck by a die blade assembly released from the presser head while the operator is loading the other die blade assembly preliminarily to shifting the same into the presser head. In this connection, the purpose of the bumpers 86—86 will be readily apparent.

It will be understood that the present invention is susceptible of various changes and modifications which may be made from time to time without departing from the general principles or real spirit of the invention, and its is accordingly intended to claim the same broadly as well as specifically as indicated by the appended claims.

What is claimed as new and useful is:

1. In apparatus for shaping and pressing collars, cuffs, flaps and like articles, a presser head having a fixed base member, and a pair of presser members positioned in superposed spaced relation thereto, a pair of die blade assemblies for receiving and shaping articles to be pressed, a pair of die blade carriages operable for moving said die blade assemblies separately in a plane from a loading zone to position said articles between the members of said presser head, and means for moving said presser members into engagement with said articles for pressing the same against said base member and then moving said presser members out of engagement with said articles to release the latter and said die blade assemblies for movement in a plane from said presser head back to said loading zone for unloading and reloading, and means for excluding each of said die blade assemblies from the loading zone while the other is unloaded and reloaded and until the reloaded assembly is about to leave said loading zone, the assembly excluded as aforesaid being thereupon automatically released for entry into said loading zone for unloading and reloading.

2. In apparatus for shaping and pressing collars, cuffs, flaps and the like articles as defined in claim 1 wherein the die blade carriages are laterally spaced and arranged for independent rectilinear movement parallel to one another, the die blade assembly excluding means is positionally fixed between said die blade carriages and intermediate their limits of travel, and each of said die blade carriages is provided with means for engaging said excluding means, whereby the carriage is automatically secured against movement into said loading zone, and for automatically actuating said excluding means upon movement in the opposite direction, whereby the other die blade carriage is released for movement into said loading zone.

3. In apparatus for shaping and pressing collars, cuffs, flaps and the like articles as defined in claim 2 wherein the die blade carriages respectively mount a pair of cam members, and the die blade assembly excluding means comprises a member mounted intermediate opposite end portions for pivotal movement, and means for yieldably biasing said member to a predetermined position wherein each of said opposite end portions is located in the path of one of said cam members.

4. In apparatus for shaping and pressing collars, cuffs, flaps and the like articles as defined in claim 3 wherein the cam members are mounted respectively on opposite sides of the die blade carriages, said cams being provided with corresponding end portions each operative to engage the associated end portion of the pivoted member for arresting travel of the carriage, and being provided with corresponding end portions each operative to cammingly engage the associated end portion of said pivoted member for rocking said member about its pivot against the influence of the biasing means and moving the opposite end portion of said member out of the path of the other cam.

5. In apparatus for shaping and pressing collars, cuffs, flaps and like articles, a presser head having a fixed base member, and a pair of presser members positioned in superposed spaced relation thereto, a pair of die blade assemblies for receiving and shaping articles to be pressed, a pair of die blade carriages operable for moving said die blade assemblies separately in a plane from a loading zone to position said articles between the members of said presser head, and means for moving said presser members into engagement with said articles for pressing the same against said base member and then moving said presser members out of engagement with said articles to release the latter and said die blade assemblies for movement in a plane from said presser head back to said loading zone for unloading and reloading, and bumper means mounted for movement with said die blade assemblies and extending outwardly beyond the rear edges of the latter for protection of the operator from said rear edges during travel of said die blade assemblies from the presser head to the loading position.

6. In apparatus for shaping and pressing collars, cuffs, flaps and like articles, a presser head having a fixed base member, and a pair of presser members positioned in superposed spaced relation thereto, die blade assembly means for receiving and shaping articles to be pressed, die blade carriage means operable for moving said die blade assembly means in a plane from a loading zone to position said articles between the members of said presser head, means for yieldably biasing said presser members away from said base member and said die blade assembly means away from said presser head and toward said loading zone, and foot actuated means operable for moving said die blade assembly means independently into said presser head and closing the latter thereon, against the influence of said biasing means, the latter being operative upon release of said foot actuated means to automatically open said presser head to withdraw said die blade assembly means from said presser head for return to said loading zone.

7. In apparatus for shaping and pressing collars, cuffs, flaps and like articles as defined in claim 6 wherein the presser members overlie separate areas of said base member and said die blade assembly means are associated respectively with said presser members and separate areas, being each of a size and form suitable for receiving and shaping a whole unit to be pressed, and each presser member and the underlying area of the base member being of a size and form suitable for receiving and pressing therebetween the unit mounted on the associated die blade assembly means, in its entirety.

8. In apparatus for shaping and pressing collars, cuffs, flaps and like articles, a presser head having a fixed base member, and a pair of presser members positioned in superposed spaced relation thereto, die blade assembly means for receiving and shaping articles to be pressed, die blade carriage means operable for moving said die blade assembly means in a plane from a loading zone to position said articles between the members of said presser head, means for yieldably biasing said presser members away from said base member and said die blade assembly means away from said presser head and toward said loading zone, foot actuated means operable for moving said die blade assembly means independently into said presser head against the influence of said biasing means, electric switch means arranged for actuation by any of said carriage means as the limit of travel toward said presser head is approached, and means connected in electric circuit with said switch means and responsive to actuation thereof to close said presser head against the influence of said biasing means and for maintaining said presser head closed for a selected period of time, said biasing means being operative upon termination of the selected period of time to automatically open the presser head and to withdraw said die blade assembly means from said presser head for return to said loading zone.

9. In apparatus for shaping and pressing collars, cuffs, flaps and like articles as defined in claim 8 wherein the electric circuit is closed when said electric switch means is actuated, and the means connected in electric circuit with said switch means includes an electro-magnetic solenoid, and a timer relay, said solenoid being energized when said electric circuit is closed, and said timer relay being operative to open said electric circuit to thereby de-energize said solenoid after a predetermined period of time during which said presser head remains firmly closed.

10. A die blade assembly for mounting collars, cuffs, flaps and like articles to be shaped and pressed comprising a pair of die blade sections disposed in coplanar relation and adapted respectively to be fitted into opposite ends of the work, a mobile carriage underlying said pair of die blade sections, and means mounting said die blade sections upon said carriage for movement therewith as a unit and for rectilinear shifting movement of one of said die blade sections relative to the other lengthwise of the work and for swinging movement of the latter die blade section in the plane thereof including a threaded member operatively interposed between said carriage and rectilinearly shiftable die blade section and revoluble about its axis for shifting the latter lengthwise of the work in order to vary the effective length of the die blade assembly as desired, said swingable die blade section being operable for reducing said effective length whereby to facilitate drawing the work over said die blade sections.

11. In a die blade assembly as defined in claim 10 wherein the die blade sections are carried by guide bar means, the rectilinearly shiftable die blade section is slidably mounted upon said guide bar means, and the latter is slidably mounted upon said carriage for shifting movement of said die blade sections and guide bar means as a unit relative to said carriage.

12. In a die blade assembly as defined in claim 10 wherein the die blade sections are carried by a pair of laterally spaced guide bars, the rectilinearly shiftable die blade section is slidably mounted upon said guide bars, said swingable die blade section is pivotally mounted upon one of said guide bars and slidably engaged with the other, and spring means is operatively interposed between said swingable die blade section and carriage for yieldably biasing said swingable die blade section in a direction away from said rectilinearly shiftable die blade section.

References Cited in the file of this patent
UNITED STATES PATENTS

| | | |
|---|---|---|
| 2,553,194 | Hovell | May 15, 1951 |
| 2,721,011 | Greco et al. | Oct. 18, 1955 |